United States Patent
Scherrenbacher et al.

(10) Patent No.: US 11,279,019 B2
(45) Date of Patent: Mar. 22, 2022

(54) MAGNETIC BASE

(71) Applicant: C.& E. Fein GmbH, Schwaebisch Gmuend-Bargau (DE)

(72) Inventors: Stefan Scherrenbacher, Waldstetten (DE); Sergej Denzel, Schwaebisch Gmuend (DE); Gabriel Huaylinos Dolderer, Schwaebisch Gmuend (DE)

(73) Assignee: C. & E. Fein GmbH, Schwaebisch Gmuend-Bargau (DE)

( * ) Notice: Subject to any disclaimer, the term of this patent is extended or adjusted under 35 U.S.C. 154(b) by 49 days.

(21) Appl. No.: 16/876,808

(22) Filed: May 18, 2020

(65) Prior Publication Data

US 2020/0361073 A1 Nov. 19, 2020

(30) Foreign Application Priority Data

May 16, 2019 (DE) .................... 20 2019 102 790.8

(51) Int. Cl.
*B25H 1/00* (2006.01)
*B23B 47/00* (2006.01)

(52) U.S. Cl.
CPC ............ *B25H 1/0071* (2013.01); *B23B 47/00* (2013.01); *Y10T 408/554* (2015.01)

(58) Field of Classification Search
CPC .... B25H 1/0071; B23B 47/00; Y10T 408/554
See application file for complete search history.

(56) References Cited

U.S. PATENT DOCUMENTS

| | | | | |
|---|---|---|---|---|
| 2,209,558 A | * | 7/1940 | Bing | H01F 7/0252 335/295 |
| 4,055,824 A | * | 10/1977 | Baermann | B23Q 3/152 335/288 |
| 4,314,219 A | * | 2/1982 | Haraguchi | H01F 7/04 294/65.5 |
| RE33,145 E | * | 1/1990 | Palm | B23Q 3/1546 279/128 |
| 5,040,299 A | * | 8/1991 | Hwang | B25H 1/0078 33/27.03 |
| 6,071,050 A | | 6/2000 | Patrick et al. | |
| 6,102,633 A | * | 8/2000 | Uehlein-Proctor | B23Q 5/32 408/129 |

(Continued)

FOREIGN PATENT DOCUMENTS

DE 10 2013 015 699 A1 3/2015
GB 2286352 A * 8/1995 ............. E01B 31/06

*Primary Examiner* — Eric A. Gates
(74) *Attorney, Agent, or Firm* — Muncy, Geissler, Olds & Lowe, P.C.

(57) ABSTRACT

A magnetic base for an electric machine tool, in particular for a magnetic core drilling machine, having a body in which is accommodated at least one first permanent magnet, the magnetic force of which combines with the magnetic force of at least one second permanent magnet to form a resultant holding force, wherein the at least one second permanent magnet is supported in the body such that it can rotate about a rotation axis through an angle of rotation between a first position in which the resultant holding force of the magnetic base is maximized and a second position in which the resultant holding force of the magnetic base is minimized, and having a controller for rotating the second permanent magnet between the first position and the second position.

25 Claims, 8 Drawing Sheets

(56) References Cited

U.S. PATENT DOCUMENTS

| | | |
|---|---|---|
| 6,331,810 B1 | 12/2001 | Jung |
| 8,568,066 B2 * | 10/2013 | Beichter .............. B25H 1/0071 408/76 |
| 9,242,367 B2 * | 1/2016 | Timmons ............. B25H 1/0071 |
| 9,669,520 B2 * | 6/2017 | Harris .................... B25B 5/061 |
| 2006/0012094 A1 | 1/2006 | Wang |
| 2016/0001439 A1 | 1/2016 | Timmons et al. |
| 2017/0232605 A1 * | 8/2017 | Morton ................ B23Q 9/0042 173/37 |
| 2021/0008677 A1 * | 1/2021 | Seebauer .............. H01F 7/0252 |

* cited by examiner

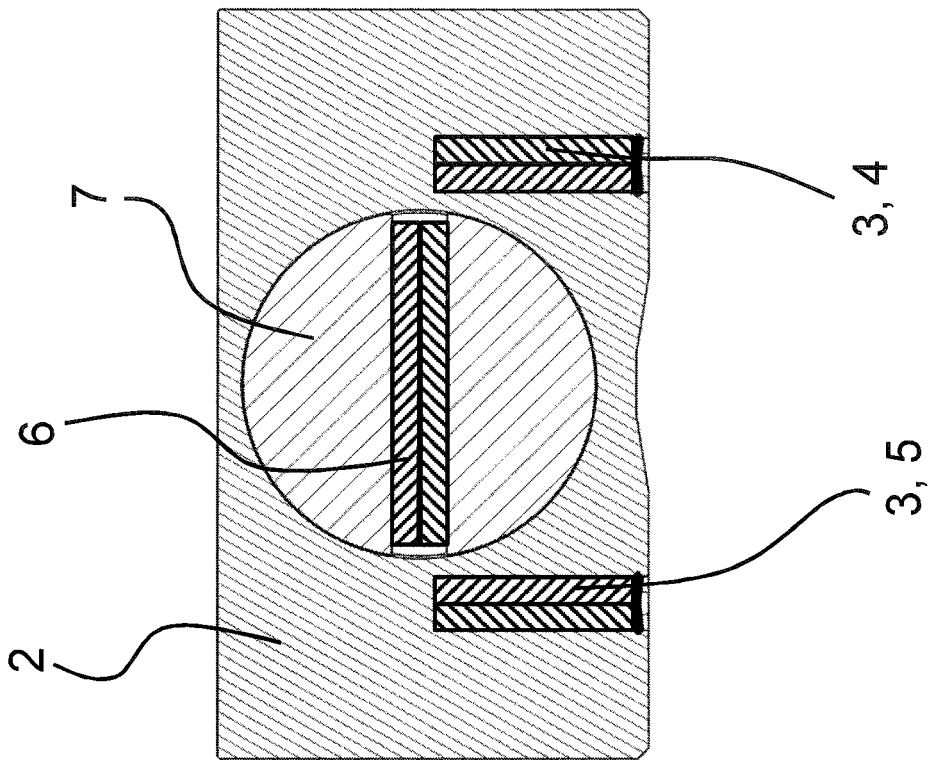
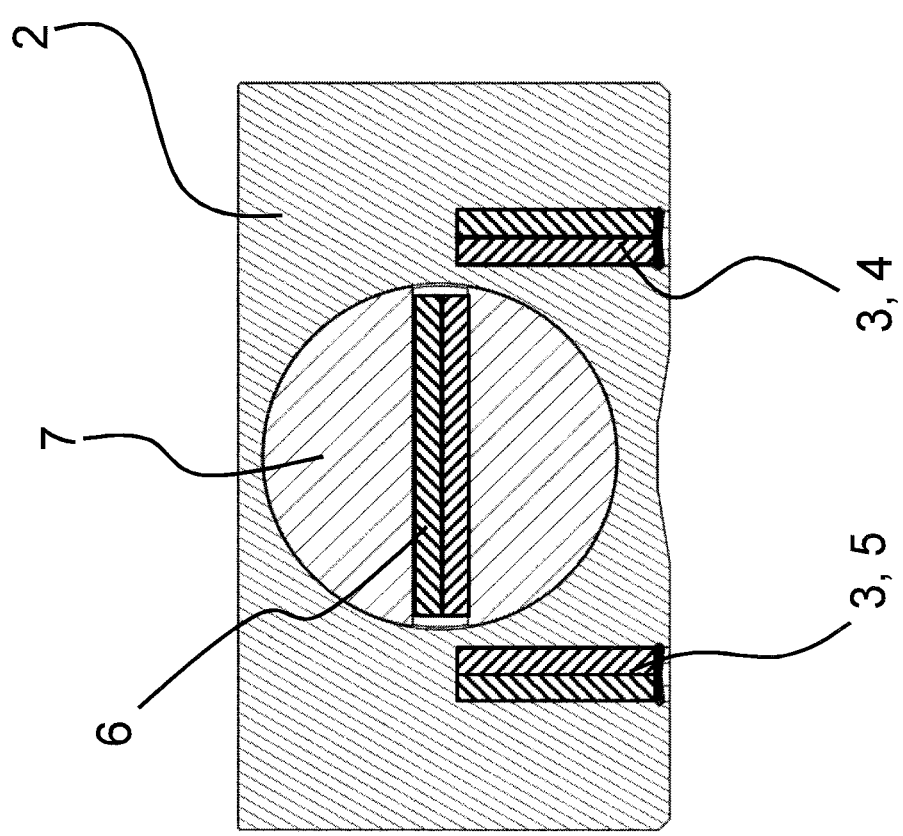

MAGNETIC BASE

This nonprovisional application claims priority under 35 U.S.C. § 119(a) to German Patent Application No. 20 2019 102 790.8, which was filed in Germany on May 16, 2019, and which is herein incorporated by reference.

BACKGROUND OF THE INVENTION

Field of the Invention

The present invention relates to a magnetic base for an electric machine tool, in particular for a magnetic core drilling machine, having a body in which is accommodated at least one first permanent magnet, the magnetic force of which combines with the magnetic force of at least one second permanent magnet to form a resultant holding force, wherein the at least one second permanent magnet is supported in the body such that it can rotate about a rotation axis through an angle of rotation between a first position in which the resultant holding force of the magnetic base is maximized and a second position in which the resultant holding force of the magnetic base is minimized, and having a controller for rotating the second permanent magnet between the first position and the second position, wherein the controller is supported such that it can pivot about a pivot axis through a pivot angle between a first end position in which the second permanent magnet is located in the first position and a second end position in which the second permanent magnet is located in the second position. In addition, the invention relates to an electric machine tool.

Description Of The Background Art

Magnetic bases have long been known from the prior art and are frequently used as part of a drill stand to mount drilling machines, and in particular core drilling machines, on the workpiece that is to be processed. Usually used for this purpose are electromagnets that are also provided with electric power through the power supply of the electric machine tool to which they are coupled, which has indeed proven very successful in the past. However, the disadvantage arises here that the magnetic holding force of these electromagnets abruptly drops off in the event of a power interruption. This ultimately results in the danger that the electric machine tool that was previously secured with the electromagnet can detach from the workpiece, which is associated with a not inconsiderable risk of injury for the user of the electric machine tool. This problem occurs especially when the electric machine tool has been mounted with the magnetic base overhead on the workpiece. In this case it is then necessary to additionally secure the electric machine tool to the workpiece with a securing device such as a belt or the like.

However, since there is a growing customer desire for freedom from the wired nature of electric machine tools, even relatively large electric machine tools such as core drilling machines are supplied with electric power from rechargeable batteries today. The limited capacity of these rechargeable batteries then makes it necessary, however, to dispense with electromagnets and use switchable permanent magnets instead. Otherwise, which is to say if the magnetic base also had to be supplied with electric power by the battery to generate the holding force, this would have an adverse affect on the operating life of the electric machine tool. In order to be able to vary the resulting magnetic holding force in these magnetic bases, the orientation of the permanent magnets located in the magnetic base, and thus of their magnetic fields, is mechanically changed here by rotating one or more of the permanent magnets relative to the other permanent magnet or magnets. In this way it is then possible to change the resultant holding force of the magnetic base and switch the magnetic base on and off.

A magnetic base of the initially mentioned type is known from US 2016/0001440 A1, for example. However, the motion of the second permanent magnet relative to the first permanent magnet has proven to be disadvantageous here, since a relatively complex transmission design is necessary for this purpose.

Moreover, especially when magnetic drilling machines are used in spatially constrained circumstances, as for example an I-beam, also called an H-beam, it has also proven to be disadvantageous that the motion of the second permanent magnet, which must usually be rotated through 180° in order to reverse its polarity to turn the magnetic base on and off, can be accomplished through the controller only with great difficulty, since the spatial circumstances here are so constrained that it is hard for the user to grip and pivot the controller.

SUMMARY OF THE INVENTION

It is therefore an object of the present invention to provide a magnetic base that reduces the above-mentioned disadvantages, and in particular facilitates operation of the magnetic base even in an environment that is difficult to access spatially. It is also the object of the invention to provide an improved electric machine tool that can be used in cramped spaces, in particular.

This object is attained according to the invention with a magnetic base in that a transmission, which is designed such that the ratio between the pivot angle of the controller and the angle of rotation of the second permanent magnet is between 1:3.6 and 1:1.5, and especially preferably is 1:2.4, is provided between the controller and the second permanent magnet.

Consequently, when the user wishes to maximize the resultant holding force of the magnetic base, he need only pivot the controller a significantly shorter distance in order to rotate the second permanent magnet from the first position into the second position. Especially when space is cramped, it is possible by this means for the user to rotate the second permanent magnet without having to pivot the controller unnecessarily far.

It has also proven worthwhile in this context when the pivot angle between the first end position and the second end position is between 50° and 120° and especially preferably is 70°. Care must be taken in this regard to find a compromise between the force to be applied and the travel distance. If the pivot angle of the controller between the two end positions is too small, the force to be applied by the user increases significantly as a result. On the other hand, if the pivot angle is made too large, then the user may find it difficult—especially in cramped conditions—to move the controller between the two end positions, even though the force to be applied is decreased. The motion of the second permanent magnet from the second position into the first position in particular requires comparatively great force, since it is necessary here to overcome the mutually repulsive magnetic forces.

To ensure uniform motion of the second permanent magnet, it has proven worthwhile when the transmission has gear teeth whose gear ratio is constant. This is also preferred for manufacturing reasons, since constant teeth are easier to manufacture. It has proven especially advantageous in this context when the gear teeth are composed of a first gear carrier and of a second gear carrier. As a result of the two gear carriers, the transmission is especially simple to implement.

It has proven especially worthwhile in this case when the first gear carrier, which is connected in a rotationally fixed manner to the controller, is designed as a segment of a circle whose angle corresponds essentially to the angle between the first end position and the second end position of the controller. This makes it possible in particular to achieve an extremely compact transmission, which has a beneficial effect on the size of the magnetic base according to the invention.

In addition, it has also proven beneficial here when the second gear carrier is circular in design, by which means the manufacturing costs of the magnetic base can be reduced further.

The transmission of force from the controller to the second permanent magnet can be made easier, in particular, when the number of teeth of the second gear carrier is between 4 and 8, and especially preferably is 5.

It has also proven beneficial when a spring element preloading the second permanent magnet into the first position is arranged between the transmission and the body. The motion of the second permanent magnet from the second position, in which the resultant holding force of the magnetic base is minimal, into the first position, in which the resultant holding force of the magnetic base is maximal, is ultimately assisted in this way. The user of the magnetic base according to the invention thus needs to apply less force to increase the resultant holding force and to switch on the magnetic base, which ultimately has a positive effect on user friendliness. In this context, it has also proven advantageous when the spring element is implemented as a torsion spring. The spring element in this design can be mounted directly to the body at a first end and to the controller and/or to the transmission at a second end. The spring element here is tensioned when the second permanent magnet is moved from the first position into the second position.

In addition, it is beneficial to operating safety when stops are formed on the body that limit the pivoting of the controller. Consequently, the user can grasp the controller and simply pivot it between the two end positions without needing to ensure that the motion does not go past the end positions. The reliability of the operation of the magnetic base is thus ultimately increased in this way.

It has also proven beneficial when the stops directly limit the motion of the transmission. In this context, it has also proven advantageous when the stops are implemented in the interior of the body and limit the motion of the first gear carrier. Since the transmission is mounted in the body, this achieves the result that the limitation of the motion can be accomplished in a region protected from the environment. However, provision is also made within the scope of the invention to limit the motion of the second gear carrier or to form the stops outside the body.

Moreover, it has also proven worthwhile when the location of the controller in the first end position and/or in the second end position is defined by a detent connection between the body and the controller. As a result, the controller can therefore be secured in the corresponding position, which reduces the danger that the holding force of the magnetic base will change unintentionally.

It has also proven especially beneficial in this context when at least one first detent seat that defines the first end position of the controller is implemented in the body. It has then proven beneficial for securing the position of the controller in the detent seat when a corresponding detent projection that has at least one guide bevel is implemented on the controller. In this design, the detent projection can engage the detent seat, and the guide bevel makes it easier for the user to tilt the controller into the detent seat. The principle of the guide bevel here is derived from the bevel that is implemented on a lock tongue and that makes it easier for the door to close.

It has also proven especially advantageous when the controller is designed as a control lever. This is especially easy for the user to grasp in order to move the second permanent magnet between the first position and the second position. However, provision is also made within the scope of the invention that the controller is designed as a rotary knob.

It has also proven beneficial when the control lever can be tilted against the force of a return element about a tilt axis that is oriented perpendicularly to its pivot axis. Especially when the location of the control lever is defined by the corresponding detent seat, it is thus possible for the user to tilt the control lever out of the corresponding detent seat by tilting it about the tilt axis and to transfer it into the next position. In addition, this also achieves the result that the user can ultimately operate the controller blind, which is to say without needing to look closely. In particular, the user can also grasp and move the controller from the side facing away from the controller. This has a considerable advantage, especially for hard-to-access workpieces such as I-beams, for example.

It has also proven advantageous when a second detent seat that defines an intermediate position in which the resultant holding force is between the minimum holding force and the maximum holding force is implemented between the first end position and the second end position. In this way, a position is ultimately defined in which it is possible for the user to place the magnetic base on the workpiece and already to lightly fix it in place. However, the holding force here must be made only strong enough that it is still possible for the user to displace the electric machine tool in order to define its final position.

Convenience for the user of the electric machine tool according to the invention is additionally improved still further when a force indicator that makes it possible to read out the resultant holding force is arranged on the end face of the body facing away from the controller. In this way the user can easily read out the resultant holding force without needing to even glance at the position of the controller. This is an advantage especially in cramped conditions when the user can only grasp the controller from the side facing away from the controller.

In this context, it has proven especially worthwhile when the force indicator is connected in a rotationally fixed manner to the axis of rotation of the second permanent magnet. Thus, when the second permanent magnet is moved between the first position and the second position by the controller, this is accompanied by a change in the force indicator, which in an especially preferred embodiment is implemented as an arrow that, in particular together with a scale printed on the body, permits a readout of the position of the second permanent magnet and thus of the strength of the resultant holding force.

It has also proven advantageous when the second permanent magnet is embedded in an essentially cylindrical casing that is rotatably mounted in the body. This substantially simplifies the assembly of the magnetic base according to the invention, in particular, and the support of the second permanent magnet within the body.

It has also proven beneficial when a switching element for switching a switch that can be connected to the magnetic base is associated with the second permanent magnet. By this means it is possible in a simple manner to achieve the result that switching on of an electric machine tool connected to the magnetic base according to the invention is only possible when the second permanent magnet is located in the first position, which is to say when the resultant holding force is maximized.

It has also proven especially advantageous in this context when the switching element is designed as a switching ball embedded in the casing. In this design the switching ball can in particular also be worked integrally into the casing, for example by means of a material removal process in which the casing is locally removed. However, a local enlargement of the outer circumference of the casing is also possible.

It has also proven beneficial when the at least one first permanent magnet is provided in multiple instances and when the multiplicity of first permanent magnets are combined into a first subgroup and into a second subgroup, which are each accommodated in the body so as to be spatially separated from one another. In this way, the resultant maximum holding force, in particular, is positively influenced.

It has also proven advantageous when an elastic pressure element, which can engage in an opening implemented on the transmission in the first end position of the controller and/or in the second end position, is mounted in the body. By this means, the user of the magnetic base according to the invention is given tactile or even audible feedback when the first end position and/or the second end position of the controller is reached.

The object relating to the electric machine tool is attained through an electric machine tool, in particular through a magnetic core drilling machine, having a magnetic base.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 2 is a sectional view along the section line II-II from FIG. 4 through the magnetic base with maximum resultant holding force, FIG. 3 is a sectional view along the section line II-II through the magnetic base with minimum resultant holding force.

DETAILED DESCRIPTION

Figure 1:
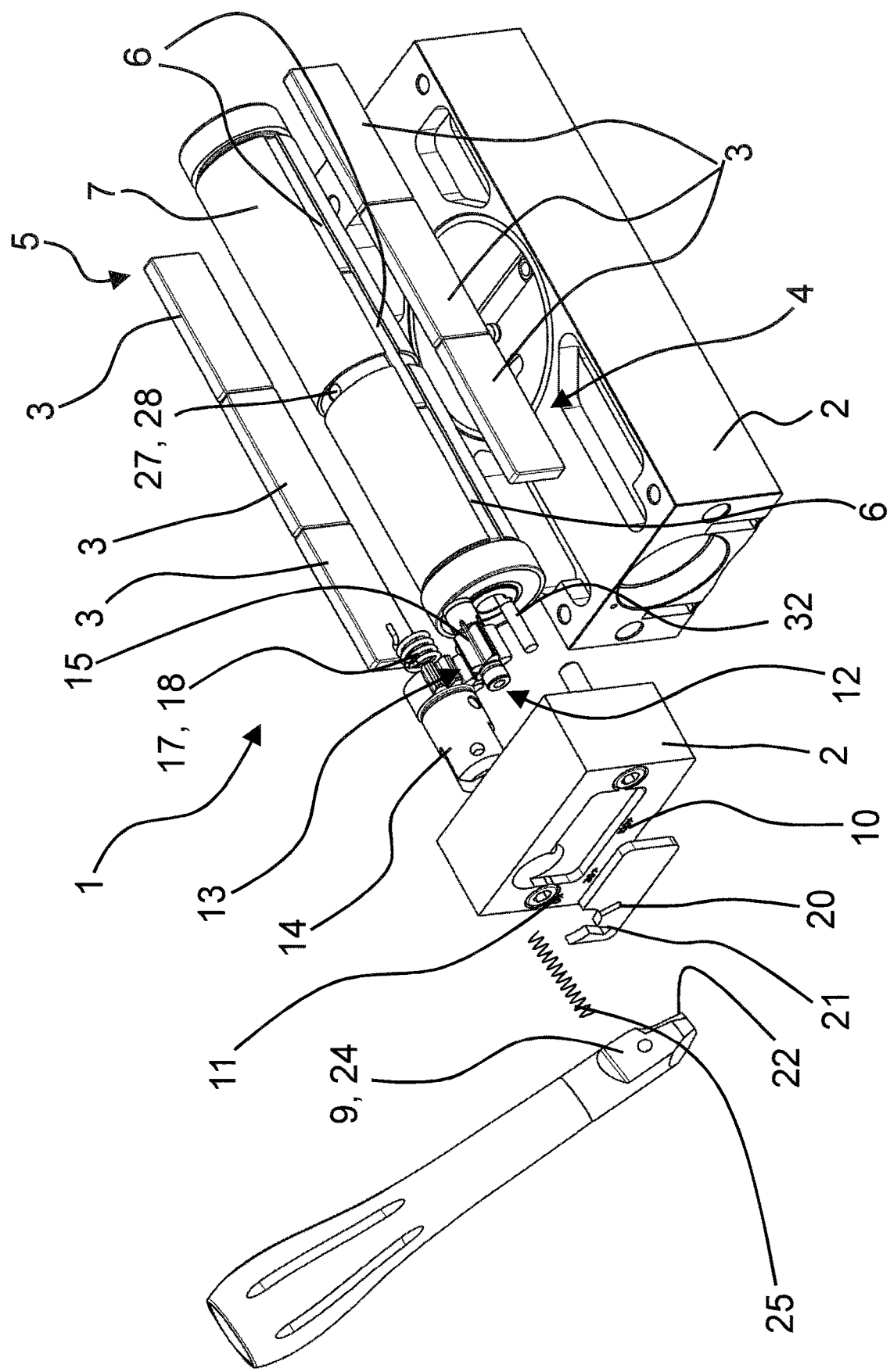
FIG. 1 is an exploded view of a magnetic base.

FIG. 1 shows an exploded view of a magnetic base 1 for an electric machine tool, in particular for a magnetic core drilling machine. The magnetic base 1 in this case has a body 2 in which multiple first permanent magnets 3 are accommodated. The first permanent magnets 3 are combined into a first subgroup 4 and into a second subgroup 5, which are each accommodated in the body 2 so as to be spatially separated from one another. The magnetic force of the first permanent magnets 3 is superimposed on the magnetic force of the second permanent magnets 6 to form a resultant holding force. The second permanent magnets 6 in this design are embedded in an essentially cylindrical casing 7 that is rotatably mounted in the body 2. In order to be able to vary the holding force of the magnetic base 1, the second permanent magnets 6 are supported in the body 2 such that they can rotate about a rotation axis 8 through an angle of rotation a between a first position in which the resultant holding force of the magnetic base 1 is maximized and a second position in which the resultant holding force of the magnetic base 1 is minimized. The rotation of the second permanent magnets 6 in this design is accomplished by a controller 9. This controller is supported such that it can pivot about a pivot axis 16 through a pivot angle β between a first end position 10 in which the second permanent magnets 6 are located in the first position and a second end position 11 in which the second permanent magnets 6 are located in the second position. Provided between the controller 9 and the second permanent magnets 6 is a transmission 12 that is designed such that the ratio between the pivot angle β of the controller 9 and the angle of rotation a of the second permanent magnets 6 is between 1:3.6 and 1:1.5, and especially preferably is 1:2.4. This means that the pivot angle β of the controller 9 between the first end position 10 and the second end position 11 is between 50° and 120° and especially preferably is 70°, while the second permanent magnets 6 are rotated through 180°.

The transmission 12, which is mounted in the magnetic base 1, has gear teeth 13 whose gear ratio is constant. The gear teeth 13 in this design are composed of a first gear carrier 14 and of a second gear carrier 15, wherein the first gear carrier 14 is connected in a rotationally fixed manner to the axis of rotation 16 of the controller 9. While the second gear carrier 15 is circular in design, the first gear carrier 14 is designed as a segment of a circle whose angle corresponds essentially to the pivot angle β of the controller 9 in order to be able to achieve the most compact possible construction. In the exemplary embodiment shown, the second gear carrier 15 has a total of 5 teeth. To facilitate the motion of the second permanent magnets 6, which are rotatably mounted in the body 2, from the second position into the first position, a spring element 17 that is implemented as a torsion spring 18 is arranged between the transmission 12 and the body 2 in order to preload the second permanent magnet 6 into the first position. To limit the rotation of the controller 9, stops 19 that are implemented in the interior of the body 2 and that limit the motion of the first gear carrier 14 are associated with the body 2.

The location of the controller 9 can be secured in the first end position 10 and/or in the second end position 11 by a detent connection between the body 2 and the controller 9. For this purpose, a first detent seat 20 that defines the first end position 10 of the controller 9 is implemented on the body 2. Furthermore, in the exemplary embodiment shown, a second detent seat 21 that defines an intermediate position in which the resultant holding force is between the maximum holding force and the minimum holding force is also implemented between the first end position 10 and the second end position 11. In this design, a detent projection 22 that is implemented on the controller 9 can engage these detent seats 20, 21. Furthermore, a guide bevel 23 is implemented on the detent projection 22 that facilitates engagement of the detent projection 22 in the detent seats 20, 21, in a manner similar to the lock tongue of a closing door.

In the exemplary embodiment shown, the controller 9 is designed as a control lever 24 that can be tilted against the force of a return element 25 about a tilt axis 26 that is oriented perpendicularly to its pivot axis 16.

It can also be seen in FIG. 1 that a switching element 27, which in the exemplary embodiment shown is implemented as a switching ball 28 embedded in the casing 7, is associated with the second permanent magnet 6. This element serves to switch a switch, which can be connected to the magnetic base, of an electric machine tool, as will be explained below in greater detail.

Figure 4:
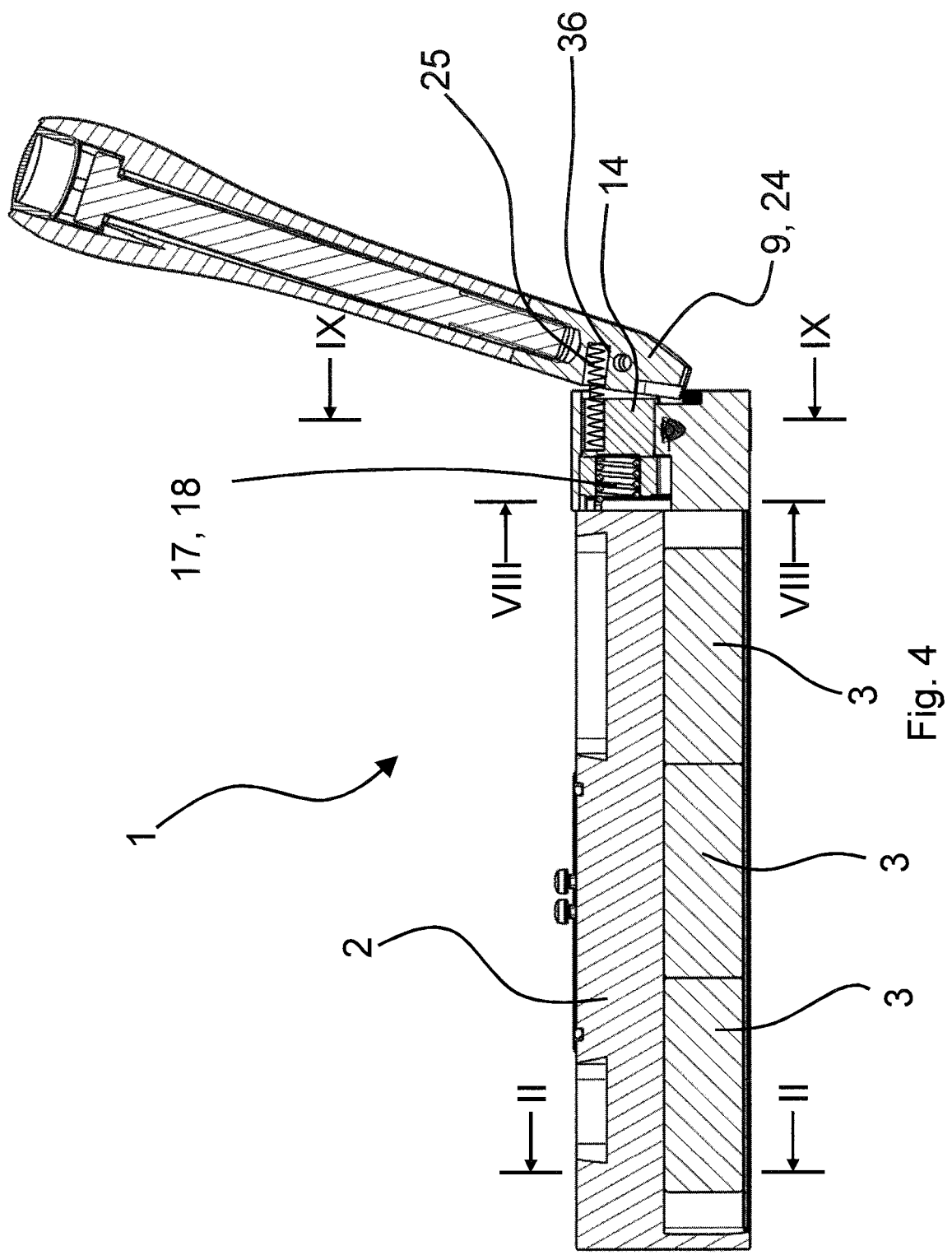
FIG. 4 is a longitudinal section through the magnetic base.

The sectional view shown in FIG. 2 through the section line II-II from FIG. 4 shows the second permanent magnets 6 in the first position, in which the resultant holding force is maximal. In this case the poles of the two subgroups 4, 5 of the first permanent magnets 3 are oriented as mirror images of one another, so that in the exemplary embodiment shown the north poles each face one another. The north pole of the second permanent magnet 6 in this case faces the north poles of the first permanent magnets 3, so that they repel one another and create a corresponding opposing field in the workpiece. If the second permanent magnet 6 is now rotated by 180°, as shown in FIG. 3, then the first permanent magnets 3 and the second permanent magnets 6 attract one another, and the resultant holding force is minimized.

FIG. 4 shows a longitudinal section through the magnetic base 1. Particularly evident here is the positioning of the first permanent magnets 3 in the body 2.

Figure 5:
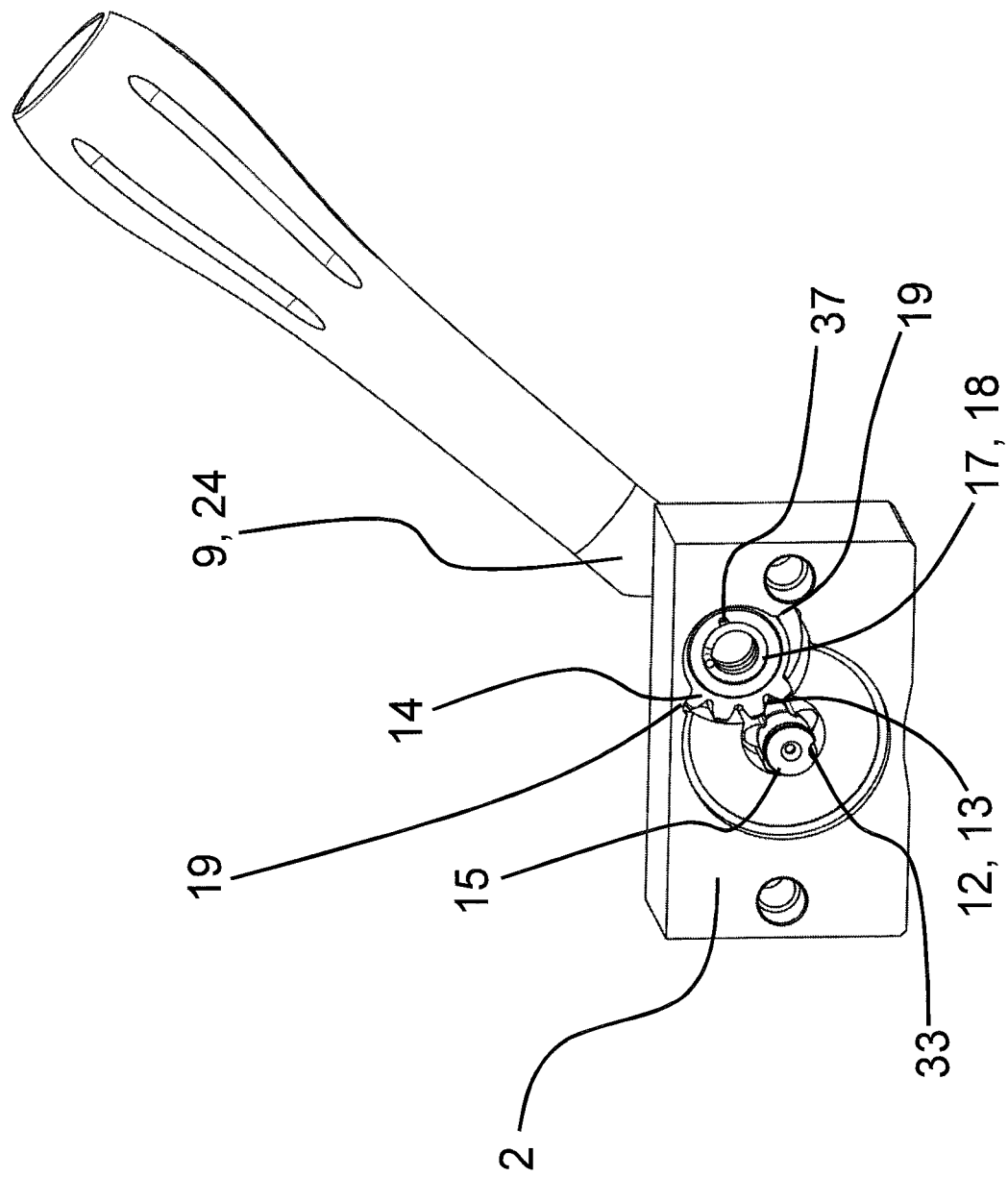
FIG. 5 is a detail view of a transmission of the magnetic base.

FIG. 5 once more shows a detail view of the transmission 12, which is mounted in the body 2, which body is implemented as multiple parts for this purpose. The individual parts in this design are screwed together by a screw connection.

Figure 6:
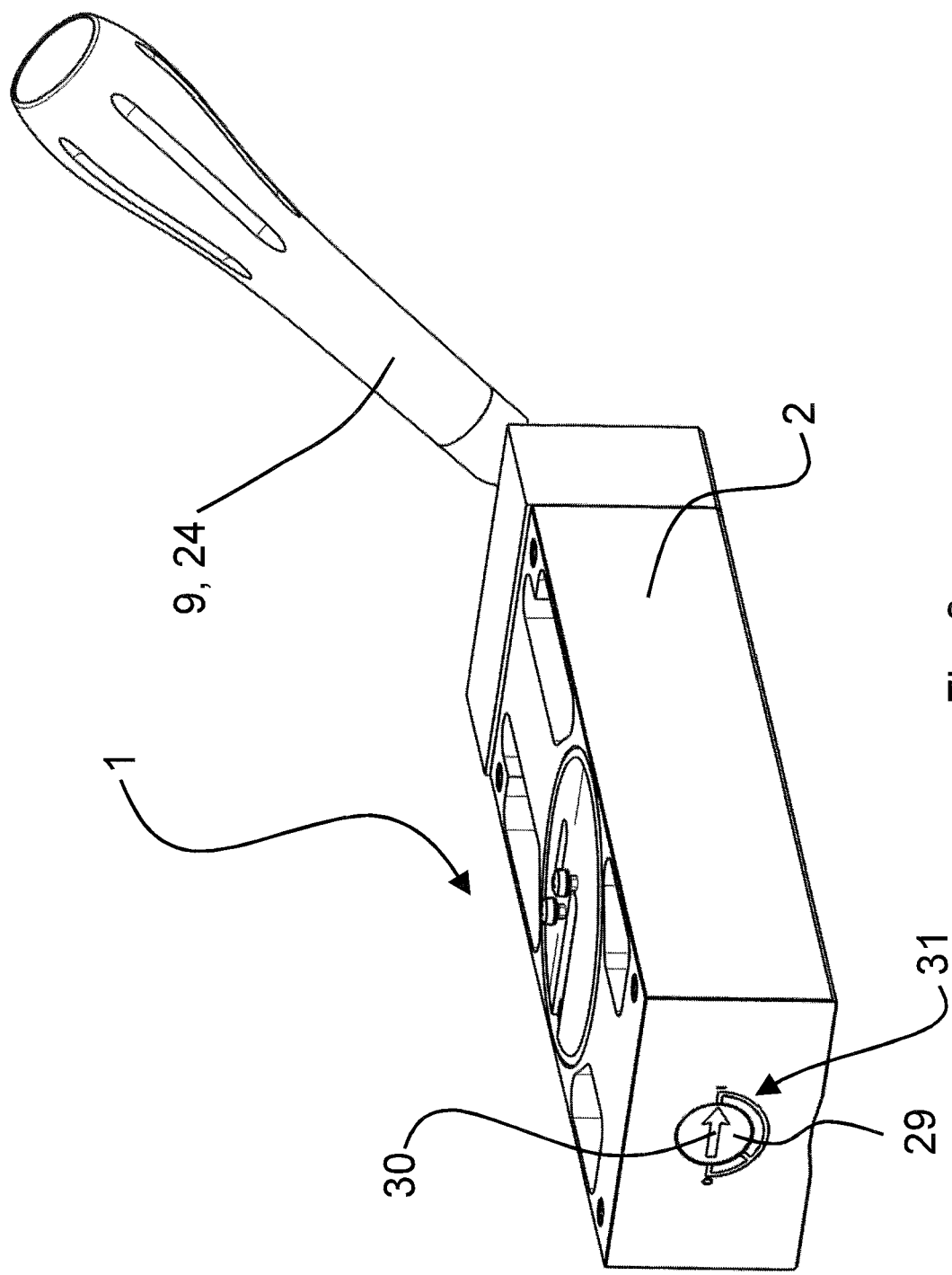
FIG. 6 is a perspective view of the magnetic base with maximum resultant holding force.
Figure 7:
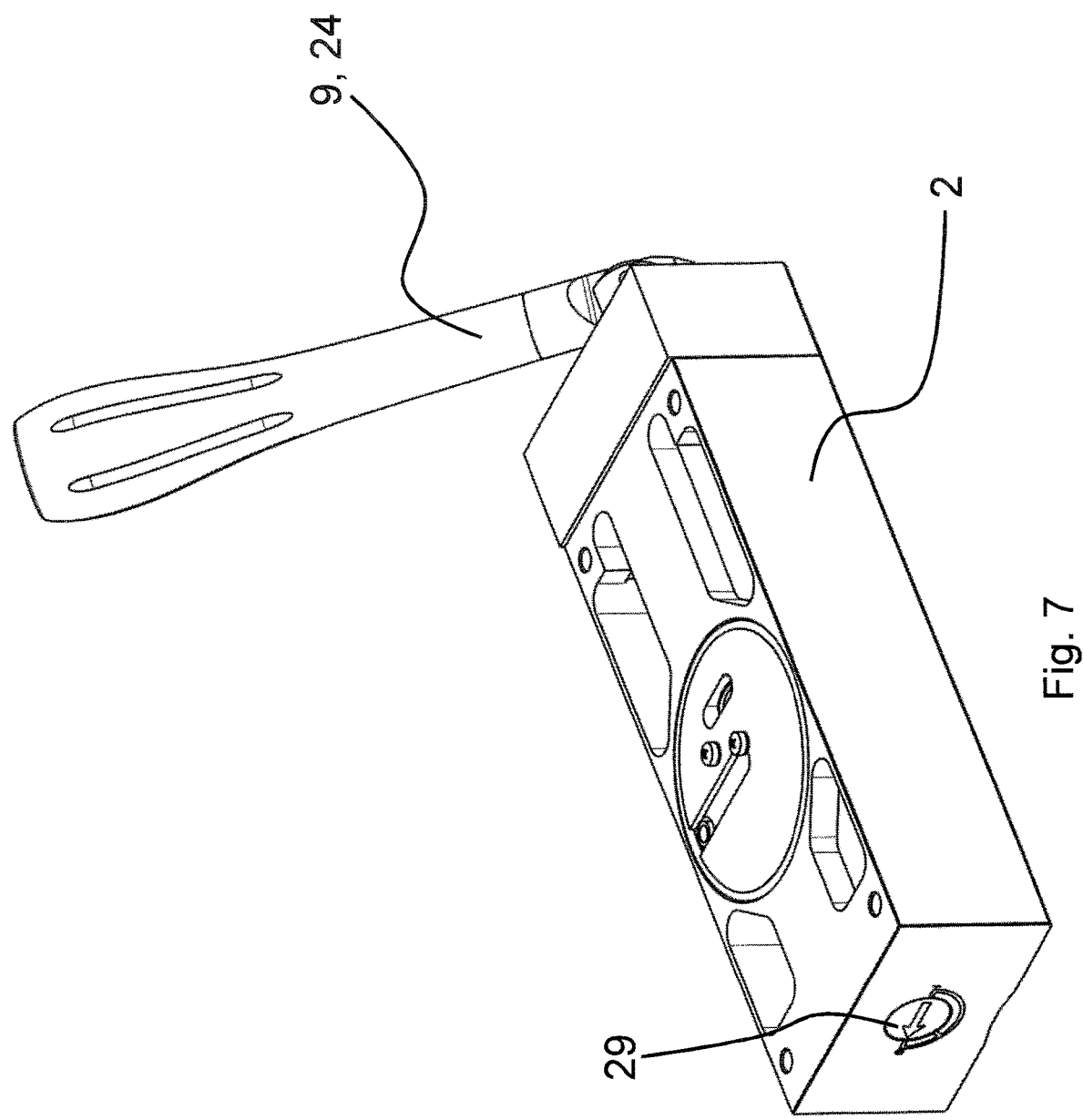
FIG. 7 is a perspective view of the magnetic base with minimum resultant holding force.

It is made evident from the perspective view shown in FIG. 6 of the magnetic base 1, in which the holding force is maximized, that a force indicator 29 that makes it possible to read out the resultant magnetic force is arranged on the end face of the body 2 facing away from the controller 9. This indicator is composed of an arrow 30 and a marking 31 depicted on the body 2, wherein the force indicator 29 is designed to be connected coaxially and in a rotationally fixed manner to the axis of rotation 8 of the second permanent magnet 6. Thus, when the second permanent magnet 6 is moved, this is very clearly evident to the user through the moving arrow 30. This ultimately makes it possible for the user to move the magnetic base 1 blind, which is to say without needing to attend to the position of the control lever 24. That is also made easier in this regard by the latching of the detent projection 22 in the detent seats 20, 21, in particular. It can be seen from the view of the magnetic base 1 with minimum resultant holding force shown in FIG. 7 that this state is also indicated on the force indicator 29. Moreover, it can be seen from a comparison between FIG. 6 and FIG. 7 that the control lever 24 was pivoted by only approximately 70°, while the arrow 30 of the force indicator 29, and thus also the second permanent magnet 6, was rotated by 180°.

Figure 8:
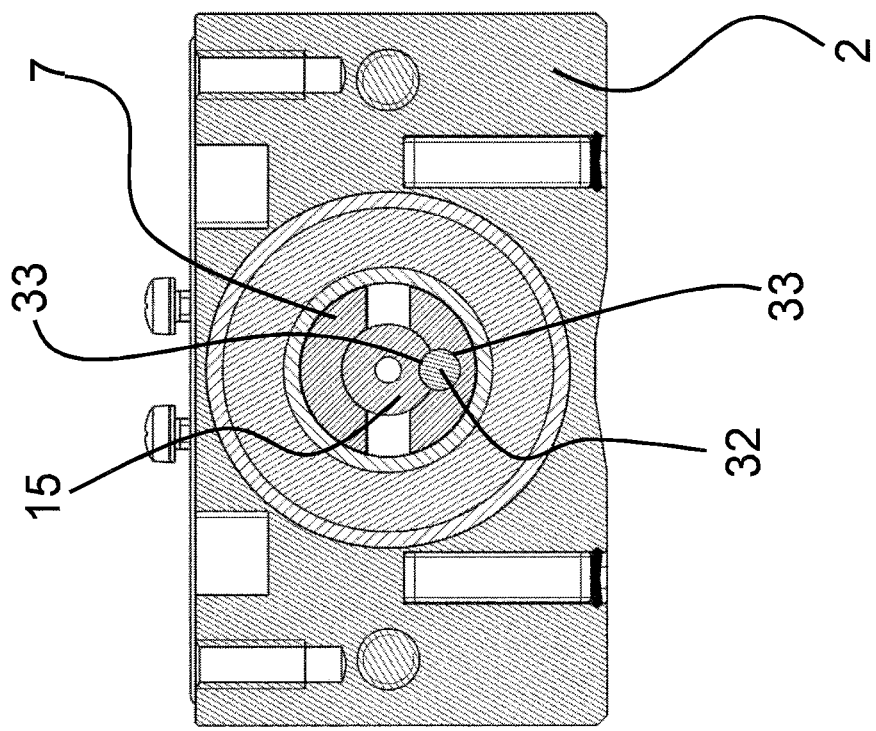
FIG. 8 is a cross-section through the magnetic base along the section line VIII-VIII from FIG. 4.

FIG. 8 shows, in a cross-section along the section line VIII-VIII from FIG. 4, the connection between the second gear carrier 15 and the casing 7 of the second permanent magnets 6. This is accomplished here by means of a connecting pin 32 that engages a recess 33 formed in the second gear carrier 15 and the casing 7 in each case, so as to connect the second gear carrier 15 to the casing 7 in a rotationally fixed manner.

Figure 9:
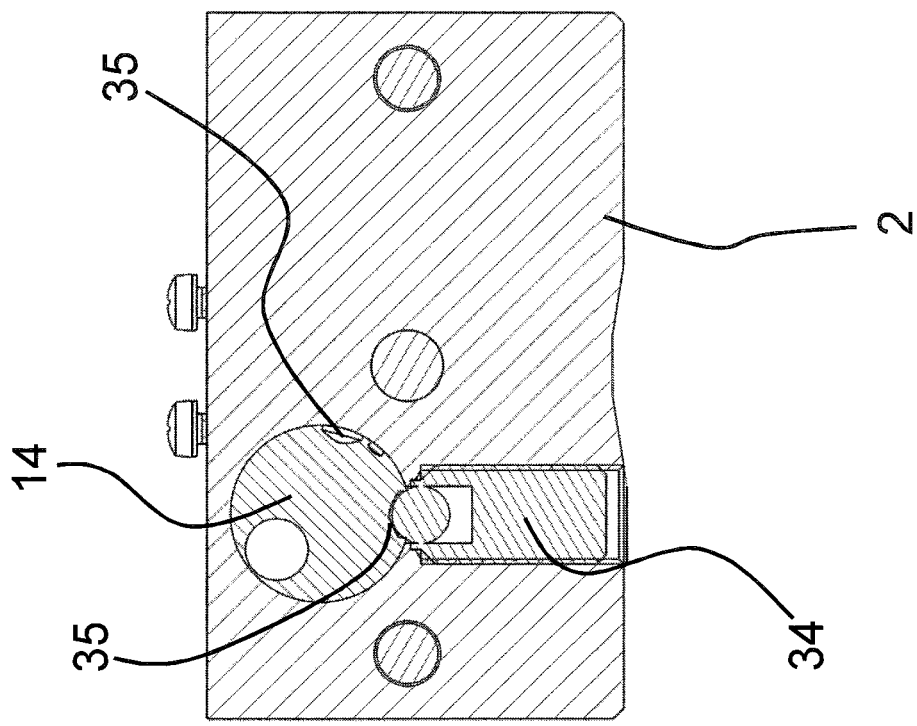
FIG. 9 is another cross-section through the magnetic base along the section line IX-IX from FIG. 4.

FIG. 9 shows the section IX-IX from FIG. 4. It can be seen from this sectional view that an elastic pressure element 34 engages appropriate openings 35 on the first gear carrier 14 that correspond to the end positions 10, 11 of the controller 9, by which means tactile feedback is provided to the user when the end positions 10, 11 are reached during moving of the controller 9, which facilitates the movement still further.

Figure 10:
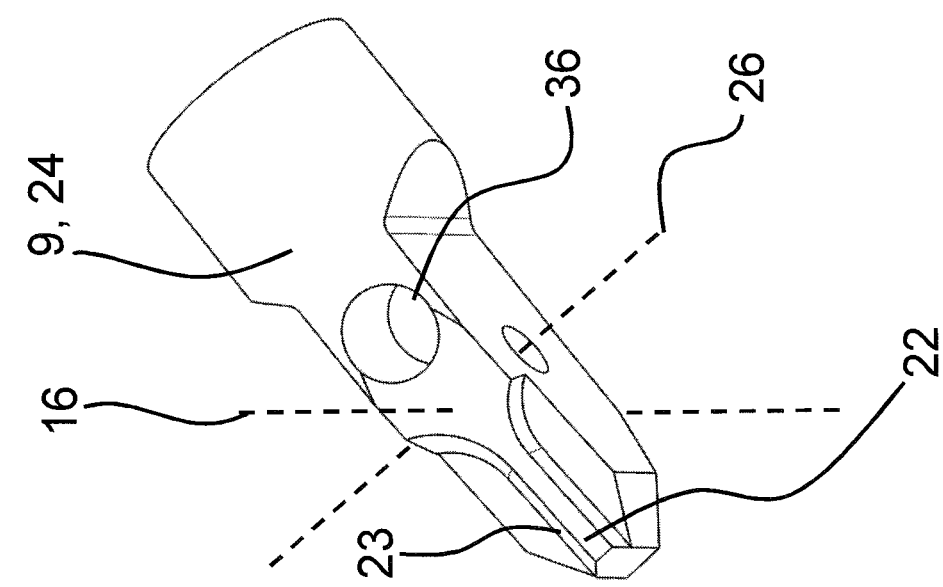
FIG. 10 is a detail view of a part of a controller of the magnetic base.

A detail view of a part of the controller 9 of the magnetic base 1 is shown in FIG. 10. This involves a part of the control lever 24. Evident here, in particular, is the detent projection 22, which on one side has the guide bevel 23, by which means the detent projection 22 can more easily engage the detent seat 20, 21, in a manner comparable with the lock tongue of a closing door. Also evident in the detail shown is a spring mounting 36 in which can be inserted the return element 25, against the force of which it is possible to tilt the controller 9 about the tilt axis 26, likewise visible in FIG. 10, that is oriented perpendicularly to the pivot axis 16.

Figure 11:
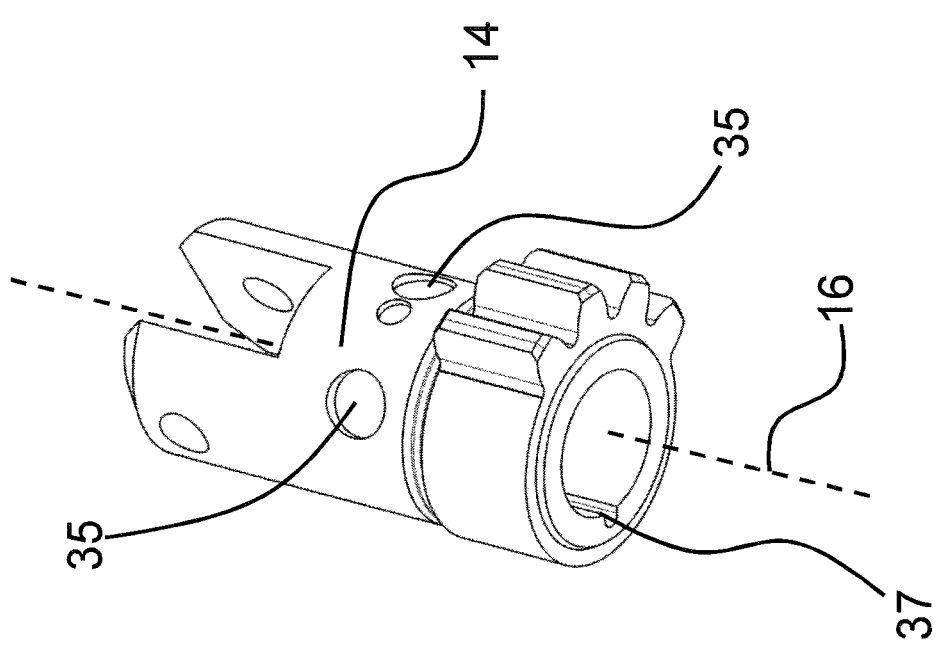
FIG. 11 is a detail view of a first part of the transmission.

FIG. 11 shows, likewise in a detail view, the first gear carrier 14 of the transmission 12. It can be seen here that the teeth are implemented only on a segment of a circle, which in the exemplary embodiment shown encompasses approximately 70°. The control lever 24 in this design is pivotably supported on the first gear carrier 14, but is connected thereto so as to be rotationally fixed about the pivot axis 16. It can also be seen on the first gear carrier 14 that a mount 37 for a leg of the spring element 17, designed as a torsion spring 18, is implemented in this case.

Figure 12:
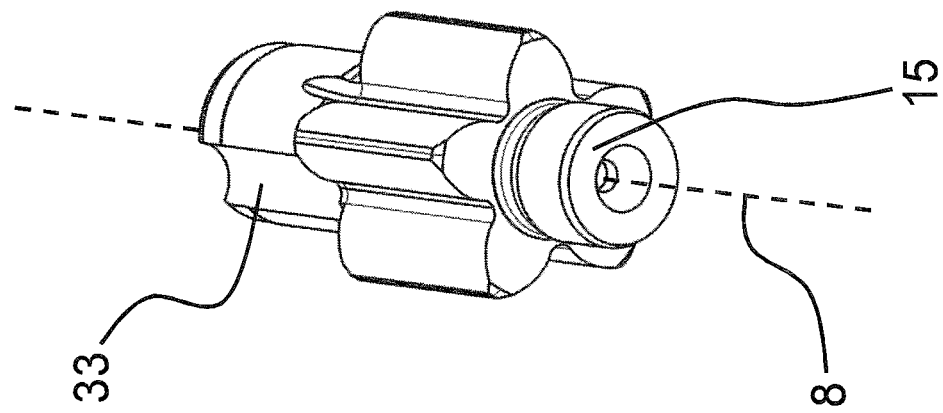
FIG. 12 is a detail view of a second part of the transmission.

The second gear carrier 15, which is shown in FIG. 12, has a total of 5 teeth. It can also be seen that the second gear carrier 15 has, at one end, the recess 33 into which the connecting pin 32 can be inserted in order to connect the second gear carrier 15 to the casing 7 of the second permanent magnet 6 in a rotationally fixed manner.

The operation of the magnetic base 1 is explained once again below. Starting from the situation shown in FIG. 7, in which the resultant holding force is minimized, the user can grasp the control lever 24 and pivot its end on which the handle is implemented about the pivot axis 16. During this motion, the second permanent magnets 6 are rotated relative to the first permanent magnets 3 by the transmission 12, causing the resultant holding force of the magnetic base 1 to be raised increasingly. This motion must be carried out in opposition to the repulsive force between the second permanent magnets 6 and the first permanent magnets 3, which is assisted by the torsion spring 18. When the control lever 24 reaches the second detent seat 21 in this process, the control lever 24 is tilted into the second detent seat 21 by the return element 25, a process benefited still further by the guide bevel 23. In this second detent seat 21, the magnetic base 1 is in an intermediate position in which the resultant holding force is already sufficient to hold the magnetic base 1, and the electric machine tool connected to it, on the workpiece to be processed. However, in this position the resultant holding force is still small enough that it is still possible for the user to move the magnetic base 1 and position it on the workpiece. If the holding force is to be increased further starting from this intermediate position, then the user must grasp the control lever 24 and first tilt it out of the second detent seat 21 in opposition to the return element 25 that defines the intermediate position. Once this tilting, which is further facilitated by the guide bevel 23, has been carried out, the user can pivot the control lever 24—once again assisted by the torsion spring 18—into the first end position 10, where it then engages the first detent seat 20. In this process, the second permanent magnet 6 is rotated into the first position and the resultant holding force goes to the maximum. In this position the magnetic base 1 is then firmly secured on the material to be processed. The motion of the control lever 24 in this process can also be accomplished from the side facing away from the control lever 24, in particular, since the resultant holding force is indicated to the user by the force indicator 29. Such a grasping, tilting, and pivoting of the control lever 24 from the side facing away from the control lever 24 is also to be considered in a positive light from an ergonomic perspective.

In the first position of the second permanent magnets 6, the switching ball 28 implemented in the casing 7 is located at the top of the body 2 facing away from the workpiece to be processed and emerges from the body. By this means it is possible to switch on a switch of an electric machine tool connected to the magnetic base 1, for example. This has the advantage, in particular, that the electric machine tool can only be switched on by the user once the magnetic base 1 is in the position in which the resultant holding force is maximized, for example. This likewise has a beneficial effect on operating safety.

When the user wishes to release the magnetic base 1 from the workpiece again, he only needs to disengage the control lever 24 from the first detent seat 20 by tilting the lever in opposition to the force of the return element 25 and then pivoting it about the pivot axis 16. When the second permanent magnet 6 is rotated about the axis of rotation 8, this also rotates the switching ball 28 implemented on the casing 7, which then results in switch-off of a switch of an electric machine tool connected to the magnetic base 1.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A magnetic base for an electric machine tool, the magnetic base comprising:
    a body in which is accommodated at least one first permanent magnet, a magnetic force of which combines with a magnetic force of at least one second permanent magnet to form a resultant holding force, wherein the at least one second permanent magnet is supported in the body such that the at least one second permanent magnet rotates about a rotation axis through an angle of rotation between a first position in which the resultant holding force of the magnetic base is maximized and a second position in which the resultant holding force of the magnetic base is minimized;
    a controller for rotating the at least one second permanent magnet between the first position and the second position, the controller being supported such that it pivots so as to pivot about a pivot axis through a pivot angle between a first end position in which the at least one second permanent magnet is located in the first position and a second end position in which the at least one second permanent magnet is located in the second position; and
    a transmission configured such that a ratio between the pivot angle of the controller and the angle of rotation of the at least one second permanent magnet is between 1:3.6 and 1:1.5, the transmission being arranged between the controller and the at least one second permanent magnet,
    wherein a spring element preloading the at least one second permanent magnet into the first position is arranged between the transmission and the body, and
    wherein the pivot angle between the first end position and the second end position is between 50° and 120°.

2. The magnetic base according to claim 1, wherein the pivot angle between the first end position and the second end position is 70°.

3. The magnetic base according to claim 1, wherein the transmission has gear teeth whose gear ratio is constant.

4. The magnetic base according to claim 3, wherein the gear teeth are composed of a first gear carrier and of a second gear carrier.

5. The magnetic base according to claim 4, wherein the first gear carrier, which is connected in a rotationally fixed manner to the controller, is designed as a segment of a circle whose angle corresponds essentially to the pivot angle between the first end position and the second end position.

6. The magnetic base according to claim 4, wherein the second gear carrier is circular.

7. The magnetic base according to claim 4, wherein a number of teeth of the second gear carrier is between 4 and 8.

8. The magnetic base according to claim 4, wherein at least one stop is associated with the body for limiting the pivoting of the controller.

9. The magnetic base according to claim 8, wherein the at least one stop directly limits a motion of the transmission.

10. The magnetic base according to claim 8, wherein the at least one stop is arranged in an interior of the body and limits a motion of the first gear carrier.

11. The magnetic base according to claim 1, wherein the spring element is a torsion spring.

12. The magnetic base according to claim 1, wherein a location of the controller in the first end position and/or in the second end position is defined by a detent connection between the body and the controller.

13. The magnetic base according to claim 12, wherein the detent connection includes a first detent seat that defines the first end position of the controller, the first detent seat being arranged in the body.

14. The magnetic base according to claim 13, wherein a second detent seat that defines an intermediate position in which the resultant holding force is between the minimum holding force and the maximum holding force is implemented between the first end position and the second end position.

15. The magnetic base according to claim 12, wherein a detent projection that has at least one guide bevel is arranged on the controller.

16. The magnetic base according to claim 1, wherein the controller is designed as a control lever.

17. The magnetic base according to claim 16, wherein the control lever is adapted to be tilted against a force of a return element about a tilt axis that is oriented substantially perpendicularly to the pivot axis.

18. The magnetic base according to claim 1, wherein a force indicator, to read out the resultant holding force, is arranged on an end face of the body facing away from the controller.

19. The magnetic base according to claim 18, wherein the force indicator is connected in a rotationally fixed manner to the at least one second permanent magnet.

20. The magnetic base according to claim 1, wherein the at least one second permanent magnet is embedded in an essentially cylindrical casing that is rotatably mounted in the body.

21. The magnetic base according to claim 1, wherein a plurality of the at least one first permanent magnet is provided, and wherein the plurality of the at least one first permanent magnet are combined into a first subgroup and into a second subgroup, which are each accommodated in the body so as to be spatially separated from one another.

22. An electric machine tool comprising a magnetic base according to claim 1.

23. A magnetic base for an electric machine tool, the magnetic base comprising:
a body in which is accommodated at least one first permanent magnet, a magnetic force of which combines with a magnetic force of at least one second permanent magnet to form a resultant holding force, wherein the at least one second permanent magnet is supported in the body such that the at least one second permanent magnet rotates about a rotation axis through an angle of rotation between a first position in which the resultant holding force of the magnetic base is maximized and a second position in which the resultant holding force of the magnetic base is minimized;
a controller for rotating the at least one second permanent magnet between the first position and the second position, the controller being supported so as to pivot about a pivot axis through a pivot angle between a first end position in which the at least one second permanent magnet is located in the first position and a second end position in which the at least one second permanent magnet is located in the second position; and
a transmission configured such that a ratio between the pivot angle of the controller and the angle of rotation of the at least one second permanent magnet is between 1:3.6 and 1:1.5, the transmission being arranged between the controller and the at least one second permanent magnet,
wherein a switching element for switching a switch that is connected to the magnetic base is associated with the at least one second permanent magnet.

24. The magnetic base according to claim 23, wherein the switching element is a switching ball embedded in a casing, wherein the at least one second permanent magnet is also embedded in the casing.

25. A magnetic base for an electric machine tool, the magnetic base comprising:
a body in which is accommodated at least one first permanent magnet, a magnetic force of which combines with a magnetic force of at least one second permanent magnet to form a resultant holding force, wherein the at least one second permanent magnet is supported in the body such that the at least one second permanent magnet rotates about a rotation axis through an angle of rotation between a first position in which the resultant holding force of the magnetic base is maximized and a second position in which the resultant holding force of the magnetic base is minimized;
a controller for rotating the at least one second permanent magnet between the first position and the second position, the controller being supported so as to pivot about a pivot axis through a pivot angle between a first end position in which the at least one second permanent magnet is located in the first position and a second end position in which the at least one second permanent magnet is located in the second position; and
a transmission configured such that a ratio between the pivot angle of the controller and the angle of rotation of the at least one second permanent magnet is between 1:3.6 and 1:1.5, the transmission being arranged between the controller and the at least one second permanent magnet,
wherein an elastic pressure element, which engages in an opening provided on the transmission in the first end position and/or in the second end position of the controller, is accommodated in the body.

* * * * *